United States Patent [19]

Wilkinson et al.

[11] Patent Number: 4,819,089

[45] Date of Patent: Apr. 4, 1989

[54] DIGITAL VIDEO RECORDER HAVING DATA DISTRIBUTION AMONG FOUR HEADS

[75] Inventors: James H. Wilkinson; John G. S. Ive, both of Basingstoke, United Kingdom

[73] Assignee: Sony Corporation, Tokyo, Japan

[21] Appl. No.: 125,829

[22] Filed: Nov. 25, 1987

Related U.S. Application Data

[63] Continuation of Ser. No. 742,536, Jun. 7, 1985, abandoned.

[30] Foreign Application Priority Data

Jun. 8, 1984 [GB] United Kingdom ................. 8414657

[51] Int. Cl.⁴ ............................................. G11B 5/02
[52] U.S. Cl. ..................................... 360/22; 360/19.1
[58] Field of Search ................... 360/19.1, 33.1, 10.3, 360/73, 54, 84, 381, 32, 22

[56] References Cited

U.S. PATENT DOCUMENTS

| | | | |
|---|---|---|---|
| 3,213,204 | 10/1965 | Okamura | 360/73 X |
| 3,463,878 | 8/1969 | Nassimbene | 360/84 |
| 3,721,773 | 3/1973 | Kluge | 360/22 |
| 4,121,264 | 10/1978 | Kishi et al. | 360/55 |
| 4,179,717 | 12/1979 | Maxey | 360/84 |
| 4,199,793 | 4/1980 | Baldwin | 360/78 |
| 4,539,605 | 9/1985 | Hoshino et al. | 360/32 |
| 4,563,710 | 1/1986 | Baldwin | 360/19.1 X |
| 4,638,380 | 1/1987 | Wilkinson et al. | 360/32 X |

FOREIGN PATENT DOCUMENTS

| | | | |
|---|---|---|---|
| 50-17801 | 2/1975 | Japan | 360/33.1 |
| 53-129012 | 10/1978 | Japan | 360/33.1 |
| 1146410 | 3/1969 | United Kingdom | 360/84 |
| 2027252 | 2/1980 | United Kingdom | 360/10.3 |
| 2050677 | 5/1980 | United Kingdom | . |
| 1579780 | 11/1980 | United Kingdom | 360/33.1 |
| 2088620 | 6/1982 | United Kingdom | 360/33.1 |
| 2092814 | 8/1982 | United Kingdom | 360/19.1 |
| 2092358 | 8/1982 | United Kingdom | 360/33.1 |
| 2121229 | 4/1983 | United Kingdom | . |
| 2111288 | 6/1983 | United Kingdom | 360/33.1 |
| 2118802 | 11/1983 | United Kingdom | 360/33.1 |

OTHER PUBLICATIONS

Published PCT Application published as International Publication No. WO 82/02810.
"Television", of Sep./Oct. 1982, vol. 19, No. 5, pp. 27–31.
SMPTE Journal, vol. 92, No. 5, May 1983, pp. 562–567.

*Primary Examiner*—Aristotelis M. Psitos
*Attorney, Agent, or Firm*—Lewis H. Eslinger; Jay H. Maioli

[57] ABSTRACT

A digital video tape recorder comprises a head drum, four transducer heads mounted in pairs on the head drum for recording oblique tracks on a magnetic tape, a demultiplexer for distributing digital data to be recorded and corresponding to a video signal such that each field of the video signal is divided into 50-line segments, the digital data corresponding to each field are evenly distributed between all four of the heads for recording, and each track comprises a block of digital data relating to one 50-line segment and a block of digital data relating to another 50-line segment, the two blocks of digital data being separated by an edit gap.

15 Claims, 4 Drawing Sheets

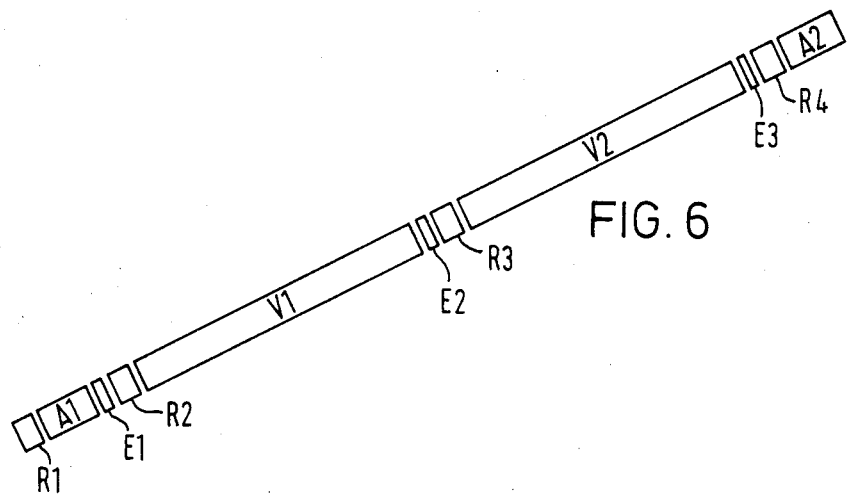

DIGITAL VIDEO RECORDER HAVING DATA DISTRIBUTION AMONG FOUR HEADS

This is a continuation of application Ser. No. 742,536, filed June 9, 1985, now abandoned.

BACKGROUND OF THE INVENTION

1. Field of the Invention

This invention relates to digital video tape recorders (DVTRs).

1. Description of the Prior Art

One previously proposed form of DVTR has, as indicated in FIG. 1 of the accompanying drawings, four rotary recording and reproducing heads A, B, C and D mounted on a rotary head drum 1, the heads A to D being arranged in two pairs A and B, and C and D. An input analog video signal is sampled and the resulting samples are pulse code modulation coded to form digital data for recording by the DVTR in oblique tracks on a magnetic tape 2. For recording, the data are divided into 50-line segments and the samples within each of these segments are equally distributed between the two heads of a pair. For a 625-line 50 Hz (50 fields per second) television system there are assumed to be three-hundred active lines per field, and for a 525-line 60 Hz (60 fields per second) television system there are assumed to be two-hundred-and-fifty active lines per field, so in 625-line operation a field occupies twelve tracks, while in 525-line operation a field occupies ten tracks. This is indicated diagrammatically in FIG. 2 of the accompanying drawings, which shows spatially the oblique tracks designated A, B, C and D to correspond to the heads A, B, C and D that recorded them.

It will be seen from FIG. 2, and possibly seen more clearly from FIGS. 3A and 3B of the accompanying drawings, which show on a time scale which of the heads A to D are recording in 525-line and 625-line operation, respectively, that in 625-line operation, because each field occupies twelve tracks, the first fifty lines of each field are always allocated to the same pair of heads A and B or C and D. In 525-line operation, however, because each field occupies only ten tracks, the first fifty lines of each field are alternately allocated to the pairs of heads A and B, and C and D.

In both 625-line and 525-line operation some problems arise in severe error conditions. Thus if, for example, the head A suffered a head clog causing total dropout, then in 625-line operation alternate 50-line segments are affected, and this results in a banding effect with three bands per picture. On the other hand, in the event of a similar head clog in 525-line operation, the banding effect changes position from field to field and this results in flicker.

SUMMARY OF THE INVENTION

One object of the present invention is to provide a digital video tape recorder in which these problems are alleviated.

Another object of the present invention is to provide a digital video tape recorder in which the digital data corresponding to each field are evenly distributed between four transducer heads arranged in pairs.

According to the present invention there is provided a digital video tape recorder comprising:

a head drum;

four transducer heads mounted in pairs on said head drum for recording oblique tracks on a magnetic tape, said pairs of heads being at an angular spacing of 180°; and a demultiplexer for distributing digital data to be recorded and corresponding to a video signal such that each field of the video signal is divided into segments, each said segment comprising the digital data corresponding to a group of successive lines of the field;

wherein the digital data corresponding to each field are evenly distributed between all four said heads for recording, and each said track comprises a block of digital data relating to one said segment and a block of digital data relating to another said segment, said two blocks of digital data being separated by a gap.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 5A and 5B show diagrammatically the division of a 525-line field and a 625-line field into five and six segments, respectively;

FIG. 6 shows diagrammatically the various parts of a single track recorded on a magnetic tape by the DVTR of FIG. 4;

DESCRIPTION OF THE PREFERRED EMBODIMENTS

Figure 1:
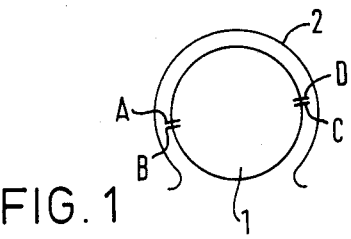
FIG. 1 shows diagrammatically a rotary head drum of a DVTR.
Figure 2:
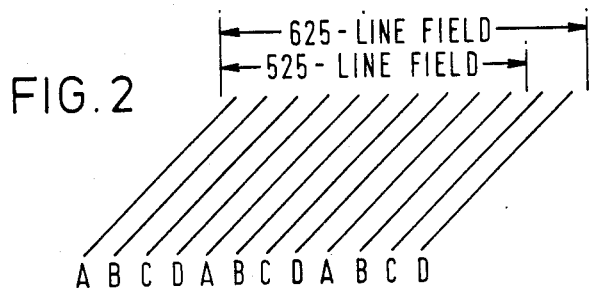
FIG. 2 shows diagrammatically tracks recorded on a magnetic tape by the DVTR of FIG. 1.
Figure 3A:
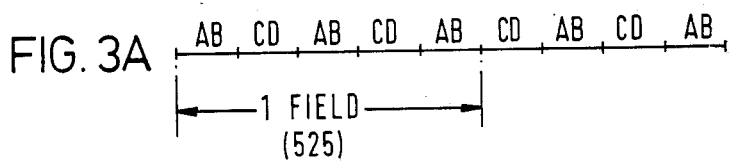
FIGS. 3A and 3B show diagrammatically 525-line and 625-line operation respectively of four recording heads of the DVTR of FIG. 1.
Figure 3B:
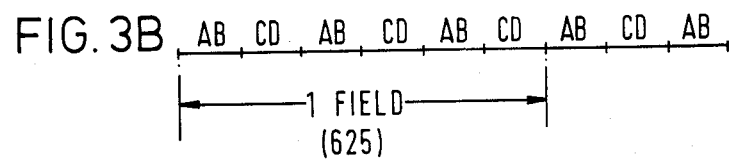
Figure 4:
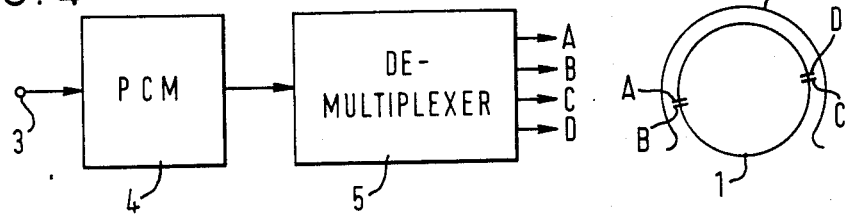
FIG. 4 shows diagrammatically an embodiment of DVTR according to the present invention.

Referring to FIG. 4, the DVTR to be described comprises a head drum 1 which in operation is rotated one-hundred-and-fifty times per second, and on which are mounted four recording and reproducing heads A, B, C and D arranged in two pairs A and B, and C and D, the two pairs being disposed 180° apart. A magnetic tape 2 is wrapped around the drum 1 over an angular range of some 240 to 330°.

An input analog video signal is supplied by way of an input 3 to a coder 4 where the input signal is sampled and the resulting samples are pulse code modulation coded to form digital data for recording. These digital data are supplied from the coder 4 to a demultiplexer 5 which distributes the data to four outputs A, B, C and D corresponding respectively to the heads A, B, C and D.

As shown in FIGS. 5A and 5B, in 525-line 50-Hz operation each field is assumed to have two-hundred-and-fifty active lines and these are divided into five segments each of fifty lines, while in 625-line 50 Hz operation it is assumed that each field has three-hundred active lines and these are divided into six 50-line segments. The number of lines within each segment can of course be varied without changing the number of segments per field, if a slightly different number of active lines per field are required. The digital data within each segment may be shuffled.

In recording the oblique tracks on the tape 2, each track recorded by each of the heads A to D is recorded as two half-tracks with a gap therebetween comprising a mid-track edit point, and each track contains recorded data relating to two different segments in the two half-tracks respectively. Such a track is shown diagrammatically in FIG. 6 and comprises two video data blocks V1 and V2, the video data blocks V1 and V2 being preceded and followed at the beginning and end of the track by audio data blocks A1 and A2. Each data block is preceded by a run-in period R1, R2, R3 or R4 respectively to provide the necessary indication on decoding that a data block follows. Additionally, at the three points between data blocks in the track, that is between the data blocks A1 and V1, V1 and V2, and V2 and A2, there is an edit gap E1, E2 or E3, respectively. Each of the edit gaps E1 to E3 can be used after the data have been reproduced where a gap is required for editing purposes, and in particular where a gap is required to enable signals being edited to be synchronized. If required, more than two audio data blocks may be provided in each track, and/or one or more audio blocks may be provided between the video data blocks.

Referring again to FIG. 4, the operation of the demultiplexer 5 will now be described for 525-line and 625-line operation. Basically the operation of the multiplexer 5 is such that the data relating to each 50-line segment are distributed to all four of the heads A to D. Thus, rather than the data of each 50-line segment occupying two oblique tracks as in the previously-proposed DVTR, the data of each 50-line segment occupy four half-tracks in this embodiment, so a 525-line field occupies twenty halftracks and a 625-line field occupies twenty-four half-tracks.

Figure 7A:
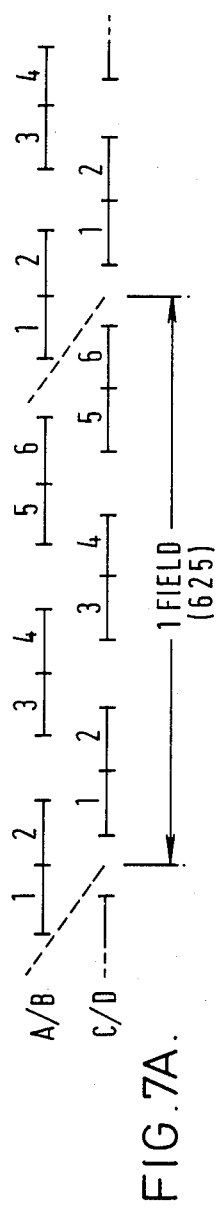
FIGS. 7A and 7C show diagrammatically which heads are recording in respective different modes of 525-line operation.
Figure 7B:
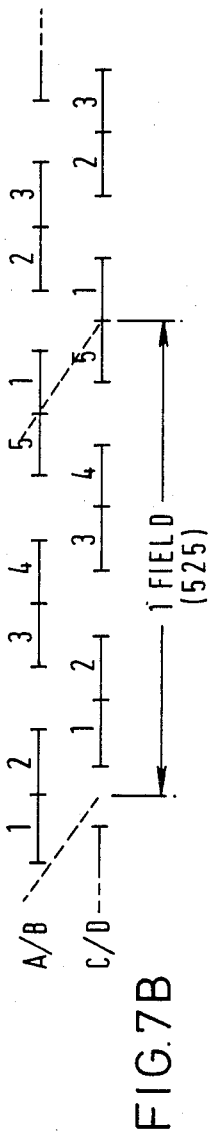
FIGS. 7B and 7D show diagrammatically which heads are recording in respective different modes of 525-line operation.
Figure 7C:
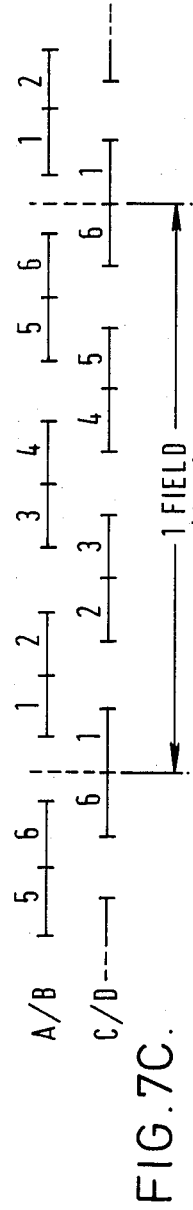
Figure 7D:
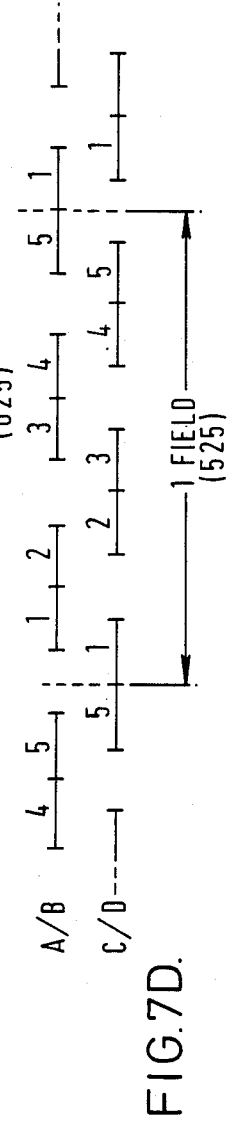
Figure 8A:
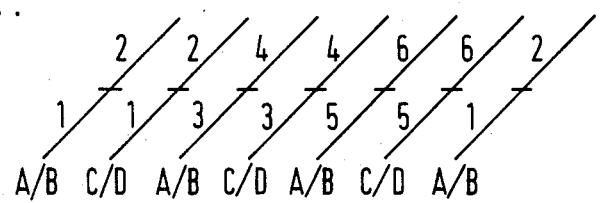
FIGS. 8A to 8D show diagrammatically tracks on a magnetic tape and correspond respectively to FIGS. 7A to 7D.

The operation of the demultiplexer 5 will now be considered in more detail with reference to FIGS. 7A to 7D and 8A to 8D. One mode of 625-line operation will first be considered with reference to FIG. 7A. In this figure the top line indicates the recording operation of the heads A and B, while the lower line indicates the recording operation of the heads C and D. Associated with each of these lines the numbers relate to the 50-line segments 1 to 6 of a 625-line field as indicated in FIG. 5B. Thus, for example, the data relating to segment 1 are evenly distributed between all four of the heads A to D, so that in each field they occupy a first half-track scan by the heads A and B and a first half-track scan by the heads C and D. As indicated, the data of one field are evenly distributed over twenty-four half-track scans. The same mode of operation is indicated in FIG. 8A which shows diagrammatically a series of pairs of oblique tracks with the numbers thereon corresponding to the segments 1 to 6 and the letters corresponding to the heads A to D.

Figure 8B:
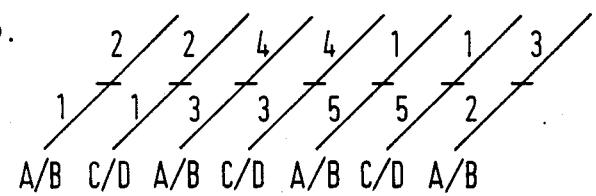

FIGS. 7B and 8B show a similar mode of 525-line operation. In this case the data of each 50-line segment are again evenly distributed to all four of the heads A to D and again the data for each 50-line segment occupy four half-tracks. Thus the data of segment 1, for example, in a first field occupy a firt half-track scan by the heads A and B and a first half-track scan by the heads C and D, and in a second field occupy a second half-track scan by the heads A and B and a second half-track scan by the heads C and D.

Figure 8C:
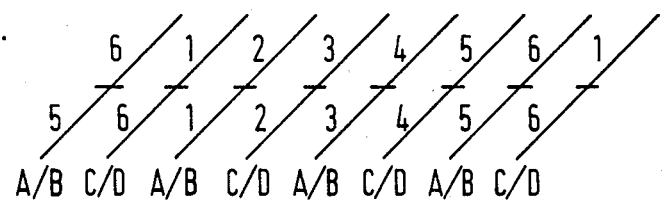

An alternative mode of 625-line operation is similarly illustrated in FIGS. 7C and 8C. The difference relative to the mode of FIGS. 7A and 8A is that the data relating to segment 1, for example, occupy a first half-track scan by the heads A and B and a second half-track scan by the heads C and D. In practice, the main difference between this mode and the mode of FIGS. 7A and 8A is that the total time occupied in recording or reproducing a field is slightly less in the mode of FIGS. 7C and 8C, as compared with the mode of FIGS. 7A and 8A. This has the advantage that preceding and subsequent processors which are to handle the data need less storage capacity.

Figure 8D:
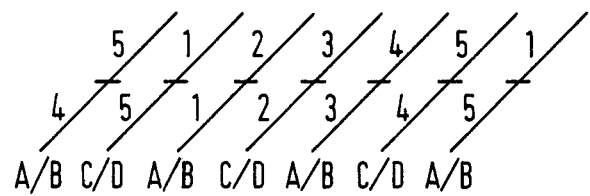

Likewise, an alternative mode of 525-line operation is illustrated in FIGS. 7D and 8D. The difference relative to the mode of FIGS. 7B and 8B is that the data relating to segment 1, for example, in a first field occupy a first half-scan track by the heads A and B and a second half-scan track by the heads C and D, and in a second field occupy a second halfscan track by the heads A and B and a first half-scan track by the heads C and D.

In all the cases described, for both 625-line and 525-line operation, the even distribution of the data between all four of the heads A to D means that in error conditions an improved reproduced picture can be obtained as compared with the previously-proposed DVTR. Thus if, for example, the head A suffered a head clog, then in all cases there would be a twenty-five percent loss of reproduced data, but the lost data would be evenly distributed over the whole of each field. This would enable optimum operation of any correction and concealment processes, and in particular there would be no banding or flickering, but merely a possible overall degradation of the picture, which is much less noticeable or objectionable to a viewer. Moreover, the provision of the half-track scans results in convenient field edit points in both 525-line and 625-line operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim

1. A digital video tape recorder for recording digital data that corresponds to a video signal comprising:
a head drum;
four transducer heads mounted in first and second pairs on said head drum for recording respective pairs of oblique tracks on a magnetic tape, said first and second pairs of heads being at an angular spacing of 180° and
a demultiplexer receiving said digital data to be recorded corresponding to a video signal for distributing the digital data evenly among said four transducer heads and said heads recording said distributed data in said tracks on said tape such that each field of the video signal is divided into a plurality of segments, each segment corresponding to a predetermined number of lines of the same field, said digital data being distributed to a first pair of tracks recorded by said first pair of heads and to a second pair of tracks recorded by said second pair of heads, such that digital data of a portion of one of said plurality of segments is recorded in first half tracks of each of said pairs of tracks and digital data of a portion of another of said plurality of segments is recorded in second half tracks of each of said pairs of tracks, said two portions of digital data in respective first and second half tracks being separated by respective gaps.

2. A digital video tape recorder according to claim 1 wherein said demultiplexer divides each field into five segments and in distributing each said segment to said four transducer heads said digital data relating to a field are recorded in twenty half-tracks.

3. A digital video tape recorder according to claim 1 wherein said demultiplexer divides each field into six segments and in distributing each said segment to said four transducer heads said digital data relating to a field are recorded in twenty-four half-tracks.

4. A digital video tape recorder according to claim 1, wherein said demultiplexer distributes said data such that said first-half tracks of said first and second pairs of tracks comprise digital data portions forming a complete one of said segments corresponding to said predetermined number of lines.

5. A digital video tape recorder according to claim 1, wherein said demultiplexer distributes said data such that a pair of said first half-tracks of said first pair of tracks recorded by said first pair of heads comprises digital data of a portion of one of said plurality of segments, a pair of said second half-tracks of said first pair of tracks recorded by said first pair of heads comprises digital data of a portion of another of said plurality of segments, a pair of said first half-tracks of said second pair of tracks recorded by said second pair of heads comprises digital data of a remaining portion of said another of said plurality of segments, and a pair of said second half-tracks of said second pair of tracks recorded by said second pair of heads comprises digital data of a portion of a next successive segment following said another segment.

6. A digital video tape recorder for recording digital data that corresponds to a video signal and to additional data comprising:
 a head drum;
 four transducer heads mounted in first and second pairs on said head drum for recording respective first and second pairs of oblique tracks on a magnetic tape, said first and second pairs of heads being at an angular spacing of 180° and
 a demultiplexer receiving digital data to be recorded corresponding to a video signal and to additional data for distributing the digital data evenly among said four transducer heads such that each field of the video signal is divided into segments, each said segment comprising the digital data corresponding to a group of lines of the same field;
 said demultiplexer distributing said digital data among said four transducer heads for recording said data on said tape in a first pair of tracks recorded by said first pair of heads and in a second pair of tracks recorded by said second pair of heads such that each pair of first and second pairs of tracks comprises a block of digital data relating to a portion of one of said segments of a video field and a block of digital data relating to a portion of another of said segments of a video field, said two blocks of digital data in at least said first pair of tracks being separated by a respective gap and said additional data being recorded in said gap.

7. A digital video signal recording system that records digital data corresponding to a video signal, comprising:
 four transducers arranged as first and second pairs on a rotary head drum for recording a field of a video signal as a plurality of respective pairs of oblique tracks formed on a magnetic tape, wherein each of said plurality of oblique tracks is divided into first and second half-tracks and said field of video signal is divided into a number of segment signals corresponding in number to a number of said pairs of oblique tracks in which one field of said video signal is recorded, and means for distributing said digital data to said first and second pairs of transducers so that a portion of one of said segment signals is recorded in said first half-tracks of each pair of oblique tracks and a portion of another of said segment signals is recorded in said second half-tracks of each pair of oblique tracks, the two portions in respective half-tracks being separated by respective gaps.

8. A video signal recording system according to claim 7, wherein a gap portion is provided between said first and second half-tracks of an oblique track to separate said segment signals recorded therein.

9. A video signal recording system according to claim 8, further comprising a head drum having said four transducers mounted in pairs thereon for forming a pair of oblique tracks on the magnetic tape for each scan of a pair of said magnetic heads, wherein each segment signal is divided into a pair of subchannel signals that are supplied to said pair of magnetic heads, respectively.

10. A video signal recording system according to claim 9, wherein said pairs of transducers are arranged on said head drum at an angular spacing of 180° said magnetic tape is wrapped for an extent greater than 180° around said head drum and said segment signals are time-expanded in accordance with a wrapping angle of said tape about said head drum.

11. A video signal recording system according to claim 7, wherein the video signal is an NTSC signal and a field of the video signal is divided into five segment signals, each said segment signal being divided into four blocks for recording in said first and second half-tracks, whereby a field of video signal is recorded in twenty half-tracks.

12. A video signal recording system according to claim 7, wherein the video signal is a CCIR signal and a field of the video signal is divided into six segment signals, each said segment signal being divided into four blocks for recording in said first and second half-tracks, whereby a field of video signal is recorded in twenty-four half-tracks.

13. A method of recording digital data corresponding to a video signal on a magnetic tape for use with a video tape recorder, comprising the steps of:
 providing a head drum having four heads mounted in first and second pairs thereon, the first and second pairs being separated by an angular spacing of 180° for recording the digital data in respective pairs of oblique tracks on the magnetic tape;
 distributing the digital data evenly among the four heads, such that each field of the video signal is divided into a plurality of segments, with each segment corresponding to a predetermined number of lines of the same field; and recording the distributed data on the magnetic tape in a plurality of pairs of slanted tracks using the four heads mounted as first and second pairs, such that first half-tracks of each pair of tracks recorded by said first and second pairs of heads have a portion of one of said segments recorded therein and second half-tracks of each pair of tracks recorded by said first and second pairs of heads have a portion of another of said segments recorded therein.

14. A method of recording digital data according to claim 13, wherein the step of recording the distributed data includes the step of recording digital data of a complete segment corresponding to said predetermined number of lines in said first half-tracks of said first and second pairs of tracks.

15. A method of recording digital data according to claim 13, wherein the step of recording the distributed data includes the step of recording digital data of a portion of one of said plurality of segments in said first half-tracks of said first pair of tracks, recording digital data of a portion of another of said plurality of segments in said second half-tracks of said first pair of tracks, recording digital data of a remaining portion of said another of said plurality of segments in said first half-tracks of said second pair of tracks, and recording digital data of a portion of a successive segment following said another segment in said second half-tracks of said second pair of tracks.

* * * * *

UNITED STATES PATENT AND TRADEMARK OFFICE
CERTIFICATE OF CORRECTION

PATENT NO. : 4,819,089

DATED : April 4, 1989

INVENTOR(S) : James H. Wilkinson; John G.S. Ive

It is certified that error appears in the above-identified patent and that said Letters Patent is hereby corrected as shown below:

Col. 1, line 6, change "June 9" --June 7--

Col. 2, line 38, change "525" to --625--

Col. 3, line 38, change "halftracks" to --half-tracks-- line 65, change "firt" to --first--

Col. 4, line 22, change "halfscan" to --half-scan--

IN CLAIMS=

Col. 5, line 48, after "180" insert --;--

Col. 6, line 36, after "180" insert --,--.

Line 60, after "180" insert --,--

Signed and Sealed this

Thirtieth Day of January, 1990

*Attest:*

JEFFREY M. SAMUELS

*Attesting Officer*   *Acting Commissioner of Patents and Trademarks*